3,132,720
DEVICE FOR SUCCESSIVELY IMMOBILIZING AND RENDERING MOBILE A LOAD DISPLACEABLE WITHIN A CONDUIT
Pierre Pounhet, Saint-Brice, France, and Arturo Pousa, Barcelona, Spain, assignors to Electricite de France—Service National, Paris, France, a national French organization
Filed Dec. 2, 1958, Ser. No. 777,712
Claims priority, application France Mar. 6, 1958
3 Claims. (Cl. 187—76)

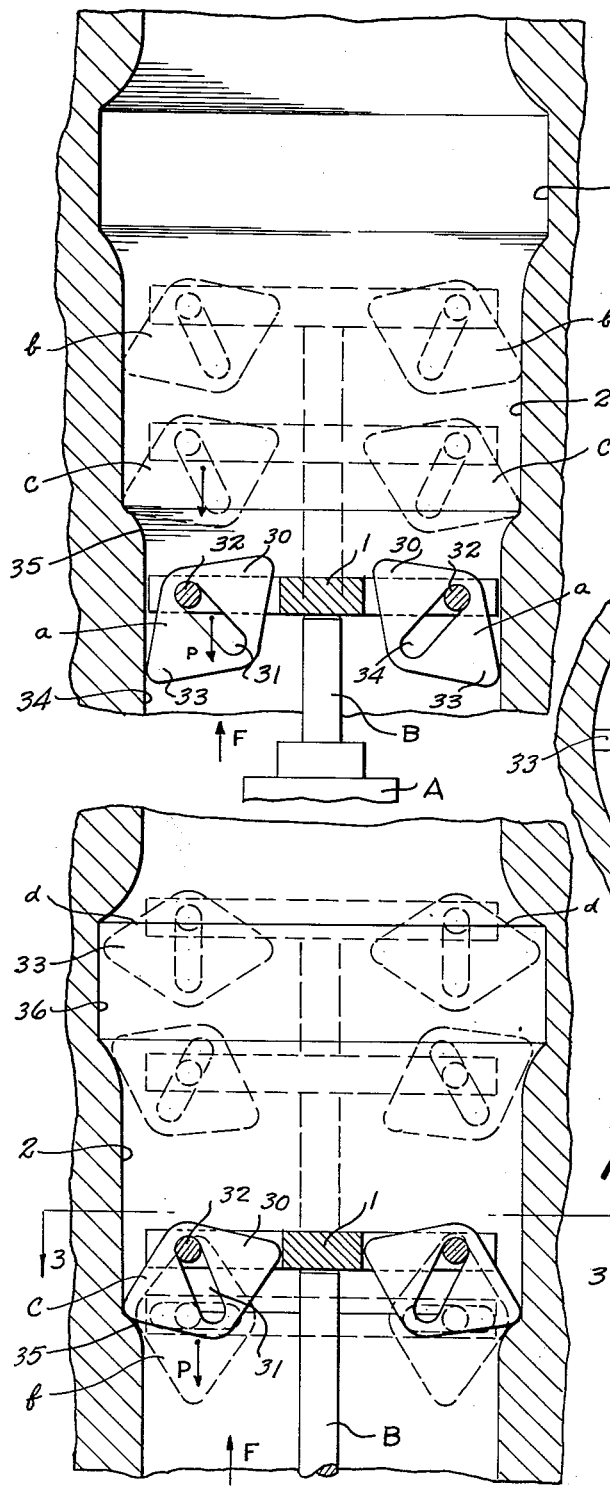
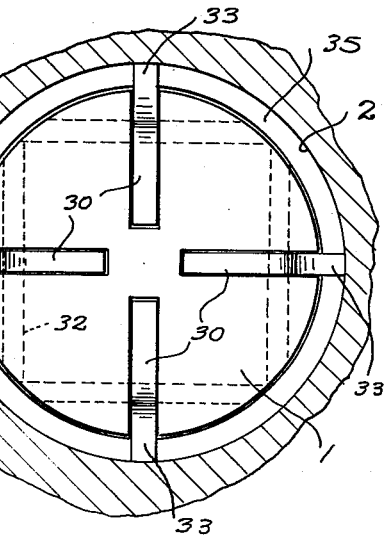
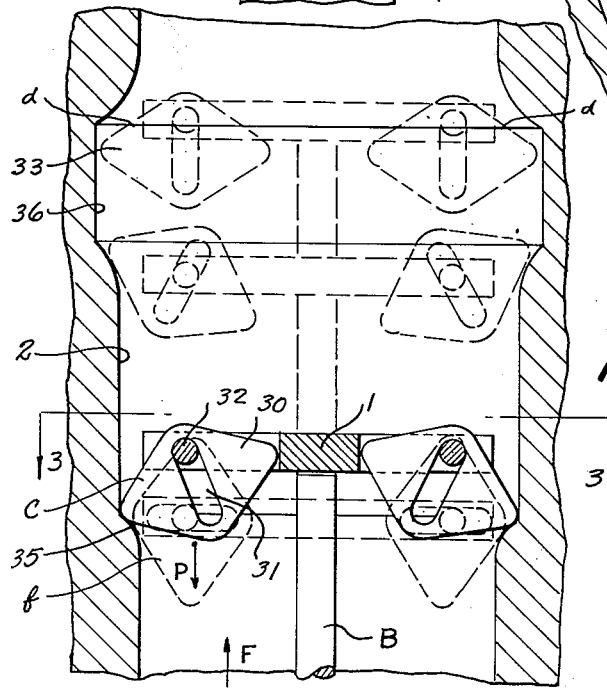

The present invention is concerned with a device for successively retaining and then releasing a load movable within a conduit.

The principal object of the invention is to provide a device for successively immobilizing and then rendering mobile a load displaceable within a conduit, but in which the movable member has an outline substantially in the form of a lozenge and is articulated on an axle integral with the loading platform, this axle being made to pass through a diagonal slot provided in the movable member.

The symmetrical form of the movable member, in conjunction with its articulation via a diagonal slot, allows using, in the first place, the two opposite corners of said movable member, which are symmetrical in relation to the diagonal slot, to successively serve as engagement claws, or to allow the movable member to be manoeuvred.

In addition, this arrangement allows immobilization to be obtained using a single protuberance and to achieve subsequent movement of the load so immobilized by employing one groove only.

Obviously, a plurality of such movable members may be articulated on to the loading platform, although it should be noted that their number may be relatively small, in view of the strength that may be built into such members.

The ridge which permits immobilization of the load, as well as the groove which permits subsequent mobility, can be provided either in the form of a circular ridge and groove affecting the entire contour of the inner surface of the conduit, or in the form of a localized protrusion and recess opposite the corresponding movable member.

The lengths, along the wall of the conduit, of the groove and of the ridge, as well as the distance separating them, may be established independently of the forms and dimensions of the movable member.

Further characteristics of our invention will become apparent from the description given hereinafter with reference to the accompanying drawing which is provided by way of example only and not in any limiting sense, and in which:

FIG. 1 is a cross-sectional view of one embodiment of the invention, showing the manner of immobilization of the load.

FIG. 2 is a corresponding view, schematically illustrating the manner of subsequently moving this load.

And FIGURE 3 is a cross-sectional view taken on line 3—3 of FIGURE 2.

Referring now to the drawing, the movable member 30 is substantially in the shape of a lozenge pierced with an elongated aperture 31 provided along its shorter diagonal. This slot 31 is traversed by an axle 32 which is integral with the loading platform 1 at both ends.

As illustrated at $a$, the movable member 30 rests against the wall 34, upon its corner 33, under the action of gravity.

At the point where it is desired to immobilize the load, the wall 34 of the conduit 2 is provided with a ridge 35. A groove 36 is provided at a certain distance above this ridge 35.

This device accordingly works as follows:

When, by any well-known means, such as for example the piston rod B of a hydraulic lift A, the loading platform is displaced in the direction of the arrow F, the axis of the slot 31 approaches the vertical position at the instant when the corner 33 crosses the shoulder portion of 35. If, once it has reached the position $b$, the loading platform is then allowed to descend, the corner 33 will bear up against the shoulder portion 35 which it will be unable to cross since, at that moment, the movable member 30 is acting after the fashion of a quoin and blocking the loading platform with the load thus being immobilized.

As soon as it is desired to shift this load, the loading platform is raised from the position $c$ by said piston rod B to the position $d$, in which latter position the corner 33 is situated opposite the groove 36, whereupon, under the effect of gravity, the movable member adopts its position of natural equilibrium, as shown at $d$.

If the loading platform is then lowered once more, the corner 33 is thrust upwards at the same time as the movable member is being displaced towards the right, about the axle 32, into the position $e$.

As the loading platform continues to descend, the slot 31 adopts a position wherein it is substantially perpendicular to the wall 34, so that, as the movable member crosses the shoulder portion 35, the latter tends to thrust it still further towards the right as indicated at position $f$, so that the center of gravity of this movable member is shifted to the right of the axle 32, causing the weight of the member to restore it into the position $a$ in FIG. 2, which is the same as the position $a$ in FIG. 1 save for a 180° rotation of the movable member.

It will therefore be appreciated that, by virtue of the existence of the slot 31, it is not necessary to cause the movable member to effect a full 360° rotation in order to bring it into a position wherein the complete device is ready to function once more. A further consequence is that load-moving and immobilizing may be effected with the provision of a single ridge or shoulder portion and a single groove within the conduit through which the loading platform travels.

The present apparatus can be employed in a number of various devices and, as an example only, though the same may be used in an atomic pile with channel 2 representing one channel of such a pile modified for the present purpose.

It is to be clearly understood that our invention is by no means limited to the specific description given hereinabove with reference to the accompanying drawing, but that on the contrary many detail modifications may be made without departing from the scope of the invention.

What we claim is:

1. A device for successively immobilizing and rendering mobile a load displaceable within a vertical conduit bore, comprising a loading platform movable downwardly inside said conduit under the effect of gravity, means for moving said platform upwardly in said conduit bore, a movable member substantially in the shape of a lozenge and having a diagonal slot and axle on said loading platform extending through said member slot with said member slidably contacting the wall of said conduit bore, said conduit bore wall having a ridge and a single groove located above said ridge cooperating with said member for successively retaining and releasing said platform.

2. A device for successively immobilizing and rendering mobile a load displaceable within a vertical conduit bore, comprising a loading platform movable downwardly inside said conduit under the effect of gravity, means for moving said platform upwardly in said conduit bore, a movable member substantially in the shape of a lozenge and having a diagonal slot, an axle member on said loading platform extending through said member slot with said member slidably contacting the wall of said conduit bore, said conduit bore wall having a ridge and a groove provided over the entire contour of the inner surface of said conduit bore wall cooperating with said member for successively retaining and releasing said platform.

3. A device for successively immobilizing and rendering mobile a load displaceable within a vertical conduit bore, comprising a loading platform movable downwardly inside said conduit bore under the effect of gravity, means for moving said platform upwardly in said conduit bore, a movable member substantially in the shape of a lozenge and having a diagonal slot, an axle on said loading platform extending through said member slot with said member slidably contacting the wall of said conduit bore, said conduit bore wall having a protuberance and a recess both located facing said movable member for cooperating therewith in successively retaining and releasing said platform.

References Cited in the file of this patent

UNITED STATES PATENTS

| | | |
|---|---|---|
| 470,730 | Welter | Mar. 15, 1892 |
| 2,229,513 | Lustig | Jan. 21, 1941 |

FOREIGN PATENTS

| | | |
|---|---|---|
| 810,119 | Germany | Aug. 6, 1951 |